United States Patent
Scahill et al.

(10) Patent No.: US 7,542,902 B2
(45) Date of Patent: Jun. 2, 2009

(54) INFORMATION PROVISION FOR CALL CENTRES

(75) Inventors: Francis J Scahill, Ipswich (GB); Paul Bryan Deans, Melton (GB); Simon Patrick Alexander Ringland, Ipswich (GB)

(73) Assignee: British Telecommunications plc, London (GB)

( * ) Notice: Subject to any disclaimer, the term of this patent is extended or adjusted under 35 U.S.C. 154(b) by 428 days.

(21) Appl. No.: 10/522,024

(22) PCT Filed: Jul. 25, 2003

(86) PCT No.: PCT/GB03/03189

§ 371 (c)(1),
(2), (4) Date: Jan. 21, 2005

(87) PCT Pub. No.: WO2004/012431

PCT Pub. Date: Feb. 5, 2004

(65) Prior Publication Data

US 2005/0216269 A1    Sep. 29, 2005

(30) Foreign Application Priority Data

Jul. 29, 2002  (EP) ................................. 02255275
Dec. 24, 2002  (GB) ................................. 0230158.8

(51) Int. Cl.
*G10L 15/04*    (2006.01)

(52) U.S. Cl. .................... 704/251; 704/270; 704/270.1; 704/231

(58) Field of Classification Search ................. 704/231, 704/270, 270.1, 251
See application file for complete search history.

(56) References Cited

U.S. PATENT DOCUMENTS

| | | | |
|---|---|---|---|
| 5,987,460 A | 11/1999 | Niwa et al. | |
| 6,108,632 A | 8/2000 | Reeder et al. | |
| 2002/0019737 A1 | 2/2002 | Stuart et al. | |
| 2002/0077830 A1* | 6/2002 | Suomela et al. ............. | 704/275 |
| 2003/0115064 A1* | 6/2003 | Gusler et al. ................ | 704/270 |
| 2004/0117409 A1 | 6/2004 | Scahill et al. | |
| 2004/0117804 A1 | 6/2004 | Scahill et al. | |

FOREIGN PATENT DOCUMENTS

EP    0283120 A1    9/1988

(Continued)

OTHER PUBLICATIONS

Rhodes, B. J. and Maes, P. 2000. Just-in-time information retrieval agents. IBM Syst. J. 39, 3-4 (Jul. 2000), 685-704.*
Tony Jebara, Yuri Ivanov, Ali Rahimi, and Alex Pentland. Tracking conversational context for machine mediation of human discourse. In AAAI Fall 2000 Symposium—Socially Intelligent Agents—The Human in the Loop, 2000.*

(Continued)

*Primary Examiner*—Vijay B Chawan
(74) *Attorney, Agent, or Firm*—Nixon & Vanderhye PC

(57) ABSTRACT

A voice platform monitors a conversation between a call center agent and a caller to identify any predetermined keywords or phrases used in the conversation therebetween. These keywords or phrases can then be used to interface into an existing knowledge management system in order to allow information from the system to be pushed to the agent, thus improving agent efficiency. In a preferred embodiment additional processing is provided which generates an information item score based in the detected keywords or phrases, and those information items with the highest scores are then pushed to the agent, by displaying shortcuts to the information to the agent in the form of a shortcut tree.

18 Claims, 9 Drawing Sheets

FOREIGN PATENT DOCUMENTS

| | | |
|---|---|---|
| EP | 0847003 A2 | 6/1998 |
| EP | 1094406 A2 | 4/2001 |
| WO | WO 98/49637 | 11/1998 |
| WO | WO 2004/012431 A1 | 2/2004 |

OTHER PUBLICATIONS

Jebara et al., "Tracking Conversational Context for Machine Mediation of Human Discourse", American Association for Artificial Intelligence (www.aaai.org). 2000.

* cited by examiner

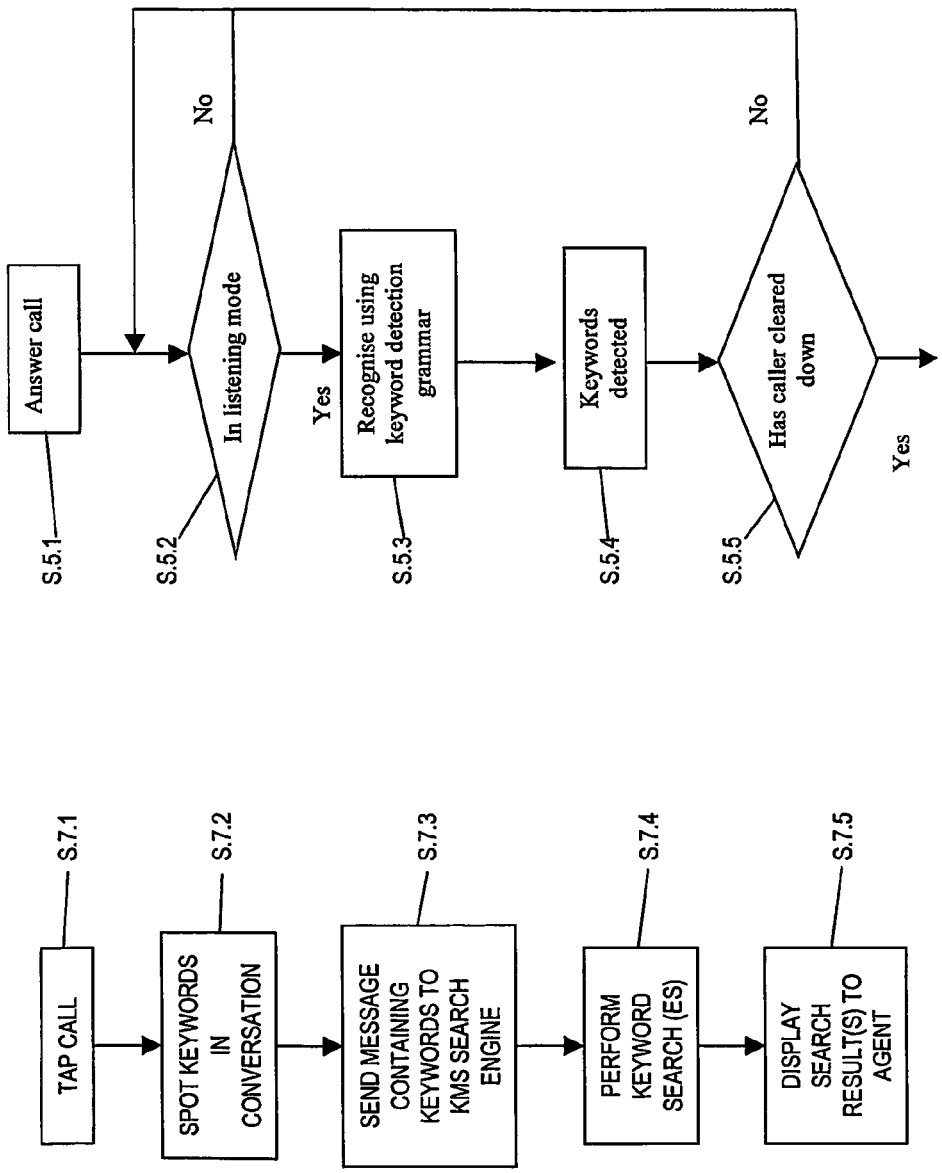

INFORMATION PROVISION FOR CALL CENTRES

This application is the US national phase of international application PCT/GB2003/003189 filed 25 Jul. 2003 which designated the U.S. and claims benefit of EP 02255275.6, dated 29 Jul. 2002 and GB 0230158.8, dated 24 Dec. 2002, the entire content of which is hereby incorporated by reference.

BACKGROUND

1. Technical Field

This invention relates to a method and system for improving the provision of information, and in particular to a method and system which improve the provision of information from a knowledge management system (KMS) provided for the use of a call centre agent.

2. Related Art

Many companies operate large call centres with agents dealing with a range of complex customer queries. Many of these requests require the agent to consult information databases to determine the correct response to a customer. It is desirable that the agent be able to complete the call as quickly as possible since this means fewer agents required within the call centre and hence reduced call centre costs.

The speed of the agent interaction depends on the agent's ability to:
1. convert the customer query into a specific database request;
2. know where relevant information in the database can be found; and
3. access that information through keyboard and mouse based user interfaces (UIs).

All of these are dependent on the agent's knowledge and experience of the company's business and products and the information systems in use in the call centre. The knowledge is improved both by training and experience, however these take time and so additional costs are incurred before the agent reaches an effective performance level.

Two further issues restrict a call centre company's ability to develop sufficient knowledge of the company business, products and IT systems within an agent:
1. Agent Churn—industry average figures of 20% per annum. This means that at any one time 20% of agents are still inexperienced and hence unable to be able to perform tasks 1, 2, 3 at maximum efficiency. For agency staff the annual churn rate can increase to 100%; and
2. Product range—as companies expand their product ranges the ability of a single agent to translate a customer query into a specific database request becomes more difficult. This is exacerbated in virtual call centres where an agent needs to be able to handle requests regarding products from multiple companies.

For companies operating call centres novice agents represent both reduced efficiency and a training cost associated with developing the agents. It is suggested that agents can typically take as long as 3 months to become completely effective.

The traditional approach to reducing call centre agent costs is to completely replace the agent with an automated Interactive Voice Response service utilising audio playout/record and Dual Tone Multi Frequency (DTMF) signals or Voice recognition. There are three classes of automation of a telephone enquiry depending on the level of voice/DTMF recognition in use:

1. Full Automation—In this situation the caller deals primarily with an IVR system that collects responses and queries databases automatically. Whilst this route can be the most effective at reducing call centre costs there can be a negative impact on customer satisfaction in particular situations where the customer query is complex.
2. Partial IVR automation—In some scenarios e.g. Directory Enquiry (DQ) automation the customer query can be broken down into a series of steps in which the early steps are within the capability of an automated IVR service, but where later steps exceed the capabilities thereof. Here IVR is used for the earlier steps and the data collected is then used to query the database. The call is then handed over to the agent part way through the database search and the agent takes over. This approach has the advantage of avoiding any potential negative effect on customer satisfaction since the caller always ends up with an agent. However the partial automation dialogue has the potential to cause negative reaction on the part of the caller and potential errors.
3. Store and Forward—To reduce agent handling time without affecting the accuracy of responses to callers, some solutions utilise Store and Forward IVR technology which utilises a very simple IVR system that is able to prompt the caller for data and record the caller responses. The responses are then played (often at speeded up rate) to the agent. The agent can then effectively perform the database search without having to have held a dialogue with the caller.

All of the above techniques open the possibility of the caller realising that they have not dealt with a live agent since there is some element of dialogue recording, and it has been found that this can produce deleterious effects on the caller satisfaction. There is therefore a trend away from IVR solutions to reducing call centre costs, and towards attempts to improve call centre agent efficiency, whilst retaining the human agent as the principal customer facing element. Several existing Agent User Interface Techniques are known already, which have as their object the improvement of agent efficiency.

Keyboard shortcuts—This mechanism only addresses agent task 3 as identified earlier. Assuming that the agent has been able to determine the nature of the query and then subsequently translate that query into a specific set of information in a database then keyboard shortcuts provide a quick and convenient mechanism to access the specific information. The disadvantages are that agents can only remember a limited set of keyboard shortcuts. The greater the number of shortcuts in use the more difficult for the agent to remember and the greater number of keys involved in the short cut. The greater number of keys involved the lower the efficiency gain. Significant agent training is required before efficiency gains are realised.

Menu Key Ahead—Many call centre applications revolve around menu driven applications where the agent navigates through a menu hierarchy to find the point in the information database where the appropriate customer response is located or where customer data can be entered. As agents become more experienced they will remember the sequence of options required to access a particular menu. By allowing key ahead, menus may be bypassed by agents thereby increasing efficiency. The disadvantages are that menu hierarchies become difficult to change, in particular inserting a new menu is impossible since it will cause unpredictable behaviour for existing key ahead behaviour. Again agent training is required before efficiency gains are realised.

Frequently asked questions (FAQs)—This mechanism can address tasks 1, 2, and 3 as identified earlier. Many queries fall into one of perhaps 10 frequently asked questions the answer for which is a specific information page in the database. It is possible to offline analyse calls to the call centre and produce a FAQ which can be displayed to the agent, the list of frequent questions can be displayed to the agent along with a mechanism for selecting from the list via keyboard or mouse. The agent can make use of the FAQ list to help classify the caller query by comparison to other queries and to provide a means of directly accessing the information from the FAQ thereby avoiding the need to know where the information resides in the database hierarchy. FAQs can be made dynamic responding to the current top N queries to the call centre. The disadvantages are that the FAQ list is related to historical queries to the call centre and may not be relevant to the current call. In reality the number of FAQs that can be displayed is limited to perhaps 10 due to available screen space. So it is particularly appropriate where the nature queries does not change frequently and where the vast majority of queries fall into a limited number of categories.

Textual Search—Here the agent types in a search query to look up the relevant information, in a similar manner to performing a keyword search on an internet search engine The disadvantages are that the time taken by the agent to type in the query can be significant, and the time taken to perform the database search can be significant.

A-Z Indexes—Similar to FAQ here the UI contains an A-Z list which the agent may select upon to gain access to a list of products and services beginning with a particular letter. The disadvantages are that some letters may be the initial letter for many products and services and so produces a page with many details requiring the agent to scan through potentially long lists. Secondly the agent and the system need to agree on what is the first letter of the product or service. For example the product may be referred to as the BT onair 1250 or the Onair1250, and so could begin with B or O. If the index system uses only one then the agent may need to make two requests to find the right one, conversely if the system lists the product under both B and O then this increases the number of matches at any one query and so reduces the benefit of an indexing system.

To reduce the agents dependence on training and experience in using the various interface techniques as described above it is known to provide HTML based knowledge management systems (KMSs) which provide call centre agents with access to product and service information and comparison engines, using the agent interface techniques described above. Such HTML systems are accessed using a web browser such as Microsoft® Internet Explorer and a standard web style. A screen shot of an example system of this type developed by British Telecommunications plc (BT) is shown in FIG. 1.

The knowledge management system (KMS) is essentially an HTML website 10 generated automatically from a knowledge database 44 (shown in use in the embodiments of the invention in FIGS. 4 and 8). The website 10 contains information regarding BT products and services, procedures that agents must follow as well as links to other knowledge sources such as call pricing tools etc. The site is structured in principle as a hierarchy of web content for example "Products/analogue cordless phones/quartet 1100/features".

The site provides several agent interface methods, will be apparent from FIG. 1. In particular, drop down menus 14 which are structured in accordance with the content hierarchy are provided, which allow an agent to navigate the information contained in the KMS by category. As will be apparent from FIG. 1, by selecting a particular category in the top-level menu a further menu is displayed, with additional sub-categories of information, the selection of which results in the display of a further menu if appropriate with additional sub-sub-categories, or the selection of the available information to be displayed. Any information selected is then accessed from the knowledge database and displayed in a display area 18 of the website 10.

In addition to the drop down menus, an A-Z index interface 16 is provided, which allows an agent to select a letter and have all the categories beginning with the selected letter displayed. The displayed categories may then be further selected to display any available information relating thereto in the display area 18.

Furthermore, a keyword search interface 12 is also provided, which allows an agent to enter a keyword which is then used in a standard keyword search of the information in the knowledge database 44. Any results are then displayed in the display area 18 for further selection by the agent.

Whilst the above description relates to the exemplary proprietary KMS developed by BT, other similar KMSs are also known. In particular, an example KMS exhibiting similar functions and maintained by easycar (UK) Ltd. was publicly available via the Internet before the priority date.

In other prior art, U.S. 2002019737 discloses a system which describes the use of an Automatic Speech Recognition system as an alternative to the GUI for entering information into a database search within a DQ call centre application.

The key features of U.S. 2002019737 is that the agent effectively acts as a mediator between the caller and an IVR system. The agent reformulates the caller verbal enquiry into a verbal form that is more easily dealt with by the IVR system. Fundamentally the IVR system is positioned between agent and database system. The system may be combined with a standard full automation IVR based database query performed at an earlier stage in the dialog after which the caller is transferred to the agent.

The system described has a number of disadvantages:—
1) A database search is entirely dependent on the operator speech, the caller speech is used only to validate an operator speech search but is not available to the agent independently;
2) the agent audio ideally must be muted in order to prevent the caller hearing the reformulated query, otherwise the possibility for caller confusion occurs;
3) (2) requires that additional switching hardware be installed to control the muting of audio;
4) whilst the agent repeats the audio enquiry to the agent IVR then there is a period of dead air in the dialogue;
5) since the database search is not performed until the agent has repeated the query then there is a loss of efficiency;
6) agent training is required in the use of the system; and
7) the system assumes that the agent is able to reformulate the query into a form which is more easily recognised than the original query from the caller, which may not be the case for inexperienced agents or complex queries.

Therefore, although knowledge management systems as described above can be effective in reducing call handling times they tend to exhibit the problem that they are dependent on agents pulling information from the KM system rather than it being pushed to the agent, and hence they are still dependent on agents becoming familiar with the system and being able to navigate effectively therethrough. With the high employee turnover rates commonly prevalent within call centres, this familiarisation time can represent a significant cost.

There is therefore a clear need for a system which proactively pushes relevant information to the call centre agent in order to overcome this problem.

However, systems are known in the art which listen to conversations and push relevant information to users in dependence on keywords within the conversation. An example of such a system is described in Jebara et al. "Tracking Conversational Context for machine Mediation of Human Discourse", published on the Internet prior to the priority date of the present invention. Within this system a commercial grade speech recognizer is used to listen to a conversation between two or more people, and to spot keywords within the conversation which relate to the topic of the conversation, so as to identify the conversational context. The keywords are then used by a computer to suggest further topics of conversation for the two people, and these topics are subsequently displayed to the people on a screen.

Such a system requires a dedicated speech recogniser to listen to the entire conversation between the two people, and hence all of the speech recogniser resources are being used to monitor the single conversation. In a call centre scenario where potentially dozens of independent conversations are simultaneously ongoing such a system would require a separate speech recogniser resource for each conversation, with the result that a separate instantiation of a speech recogniser application would be required for each agent station. This requirement imposes technical drawbacks in terms of wasted speech recogniser resource, and economic drawbacks in terms of the separate software licences required being required for each agent station.

SUMMARY

To overcome the problems with existing UI techniques as outlined above, a new agent efficiency mechanism utilizes voice recognition of the conversation between a caller and an agent to suggest information shortcuts to the agent. The information shortcuts (or, if appropriate, the information itself) may then be displayed to the agent. Preferably the information or the shortcuts thereto are continually adapted to the context of the voice conversation between caller and agent. Additionally, the exemplary embodiment also provides measures to overcome the problems of having to provide an individual speech recognizer application for every agent station, by selectively employing the speech recognizer application only at certain times of the call. By such selective employment a single speech recognizer application may be effectively shared between two or more agent stations in a call center, thereby improving the technological and economic efficiency of the center.

In view of the above, from a first aspect there is provided an information interface system, comprising:

speech recognition means arranged to listen to voice signals carried on a communications channel between a user and another person, and to recognise at least one or more predefined keywords or phrases contained within the voice signals;

keyword processing means arranged to relate any recognised keywords or phrases to items of information stored in an information database so as to identify relevant items of information thereto;

information display means arranged to display any items of information and/or links thereto identified by the keyword processing means to the user; and speech recognition control means arranged to activate or deactivate the speech recognition means in response to one or more predetermined criteria.

The system provides the advantage that it automatically converts keywords or phrases to relevant entries in the knowledge management system, reducing the time spent on converting the customer query into a specific database request and knowing where relevant information in the database can be found.

Moreover, agent skill level requirements are reduced since knowledge of where information resides in the KM system is provided by the system rather than by the agent. The improved ease of use for the agent can have positive effect on reducing agent churn, and also the system does not require the agent to change their behaviour and so requires reduced agent training time.

In addition, as keyword spotting is applied transparently to both the agent and caller, there is no break in dialogue and 'no dead air' since agent interaction with the speech recognition system is performed in parallel and in the background. Similarly, the system does not involve handover between a fully automated IVR system and an agent. Both of these advantages act to improve caller satisfaction.

Furthermore, as the system listens for multiple keywords or phrases within the audio stream it is possible to make available the results for all possible matches simultaneously.

Additionally, as the speech recognition means are activated and/or deactivated in response to one or more predetermined criteria, expensive speech recogniser resources are conserved, and only used on that part or parts of a call wherein keywords are likely to be usefully spoken.

Finally, the system provides that muting of the agent audio is not required and hence no special switching hardware need be installed, thus reducing cost of installation of the system.

In a preferred embodiment, the keyword processing means further comprises:

storage means for storing item definition data defining the items of information in the information database;

item matching means for matching recognised keywords or phrases to the item definition data; and item scoring means for keeping an item score for each item of information in dependence upon the number of keywords or phrases matched to each item.

This allows further processing to be performed on the potential matching items, thus improving the accuracy of the system in displaying information or shortcuts which are actually relevant to the caller's query.

Moreover, in the preferred embodiment the keyword processing means further comprises item sorting means arranged to sort the items of information in dependence on the respective item scores. This provides the advantage that the information or shortcuts can be displayed to the user in a structured manner, with items determined to be most relevant near the top (or conversely the bottom, depending on the direction of the sort) of the display.

In addition, sorting the results allows for an indication as to which information items are determined to be of most relevance, and hence should be perfected from the information database. Auto loading removes the need for the operator to use the mouse or keyboard at all thereby further speeding the agent interface, and perfecting of potential pages speeds up the apparent responsiveness of the backend database system without requiring upgrading of the database servers.

Moreover, within the preferred embodiment the keyword processing means further comprises item score thresholding means arranged to apply at least one threshold to the item scores, wherein those items whose item scores do not meet the threshold are not made available to the user. This ensures that the list of information items sent to the user is maintained to a manageable level. Preferably the threshold is user adjustable.

Preferably, the information display means is arranged to display the items of information and/or links thereto as a hierarchical structure. Agent training time and hence cost is reduced since the structure of the shortcut tree reinforces the existing hierarchical route to information through the HTML site, thus providing implicit training.

Moreover, preferably the speech recognition means, the keyword processing means and the information display means are substantially continuously or periodically operable so as to continually or periodically update the items of information and/or links thereto displayed to the user. Since the tree is dynamically and automatically reordered with each new shortcut suggestion then it is possible to utilise a single keyboard shortcut to access the newest shortcut in the tree. A single, single key shortcut is faster for operators to learn and use.

From a second aspect the invention further provides a method of interfacing information to a user, comprising the steps of:

listening to voice signals carried on a communications channel between the user and another person;

recognising, in response to one or more predetermined criteria, at least one or more predefined keywords or phrases contained within the voice signals;

relating any recognised keywords or phrases to items of information stored in an information database so as to identify relevant items of information thereto; and displaying any items of information and/or links thereto so identified to the user.

In the second aspect the invention provides the same advantages and further features as described for the first aspect. Such further features will be readily apparent from the appended claims.

Moreover, from a third aspect the present invention further provides a computer program so arranged such that when executed on a computer it causes the computer to perform the method of the previously described second aspect.

In addition, from a fourth aspect, there is also provided a computer readable storage medium arranged to store a computer program according to the third aspect of the invention. The computer readable storage medium may be any magnetic, optical, magneto-optical, solid-state, or other storage medium capable of being read by a computer.

BRIEF DESCRIPTION OF THE DRAWINGS

Further features and advantages of the present invention will become apparent from the following description of embodiments thereof, presented by way of example only, and made with reference to the accompanying drawings, wherein like reference numerals refer to like parts, and wherein:

FIG. 5 is a system flow diagram illustrating the steps performed by the first embodiment of the present invention;

FIG. 6 is a flow diagram illustrating the operation of the keyword recogniser used in the embodiments of the present invention;

FIG. 11 is a screen shot of the display of information shortcuts to the user obtained by the second embodiment of the invention.

DETAILED DESCRIPTION OF EXEMPLARY EMBODIMENTS

Two embodiments of the invention will be described with reference to the drawings. More particularly, a first embodiment will be described with respect to FIGS. 2 to 7, followed by a second embodiment described with reference to FIGS. 2 and 3, and 6 to 11. Each of the first and second embodiments share a common sub-system in respect of those elements used for activating and deactivating the speech recogniser means. Therefore, within the following the description the first and second embodiments will each be separately described in turn, and then a common description of the operation of the selective activation of the speech recogniser means will be undertaken.

Figure 4:
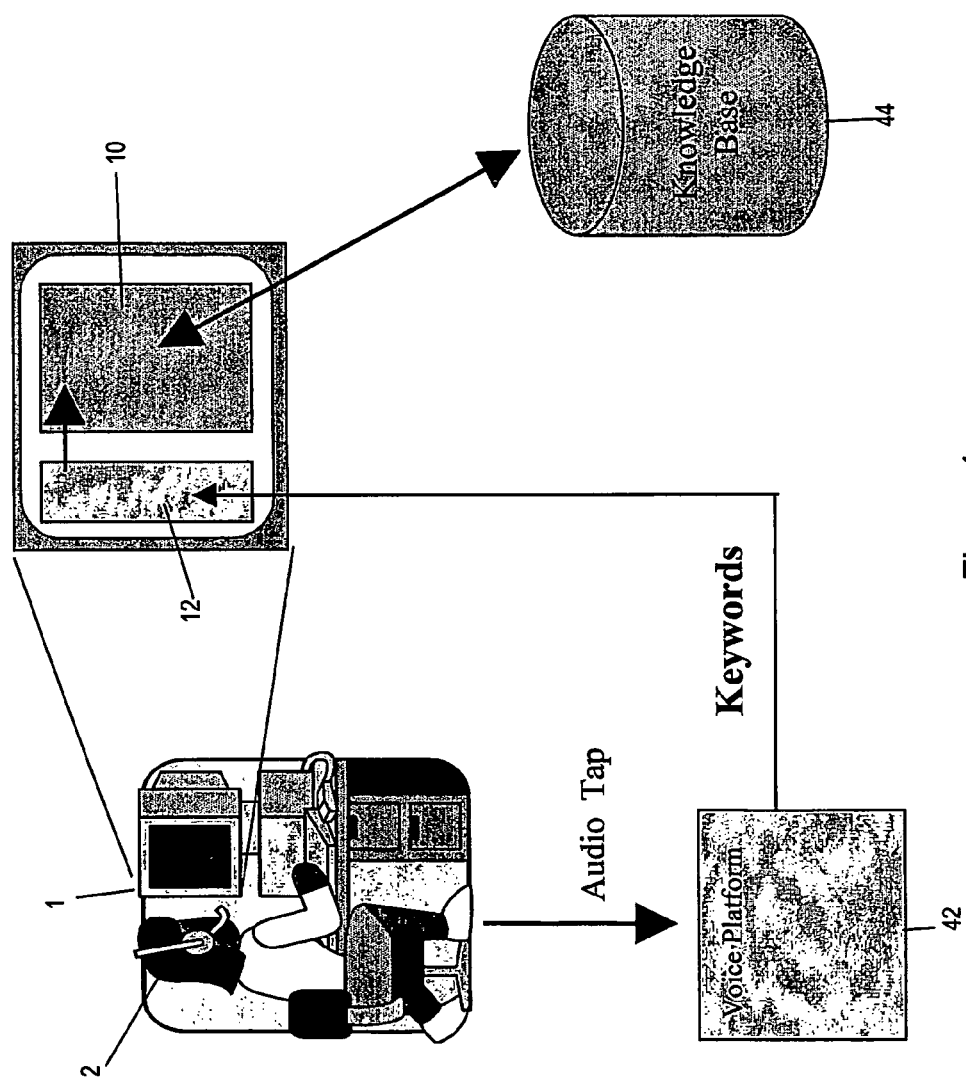
FIG. 4 is a system block diagram illustrating the system blocks of a first embodiment of the present invention.

FIG. 4 illustrates a block diagram of the system provided by the first embodiment of the invention. The operating principle of the first embodiment is that a voice conversation between a call centre agent and a caller is listened to and one or more predefined keywords or phrases are recognised therein by a keyword speech recogniser. The identified keywords or phrases are then passed to the agent's computer where they are displayed to the agent. The agent may then select the identified keywords or phrases for input to a standard search engine provided in an existing knowledge management system, to which the keywords or phrases relate. The results of the search are then displayed to the agent on the agent's screen.

It should be noted here that where we make reference herein to "keywords", then such reference implicitly includes reference to key phrases as well. That is, by use of the term "keywords" we implicitly intend to encompass both predefined keywords and predefined keyphrases, with a "keyphrase" being simply a sequence of two or more words which may in combination perform the same function within the embodiments of the invention as a keyword. This applies to all of the embodiments of the invention to be described.

With reference to FIG. 4, the first embodiment of the present invention provides a system wherein a call centre human agent 2 is provided with a computer 1 which has access to an existing knowledge management system, comprising a knowledge database 44 storing items of information which are relevant to the human agent's function, and a display provided by a knowledge management system client application installed on the computer 1, which display comprises an information display part 10, and a keyword display part 12. In addition, the first embodiment further provides a speech recogniser application stored either on the agent's computer 1, or on another computer which is communicable with the agent's computer 1 over a network, which application when run on the computer upon which it is installed provides a voice platform for recognising keywords in a conversation between the agent 2 and a caller. The voice platform 42 is arranged to tap into a communications channel such as a telephone line, or Voice over IP connection, established between a caller and a human agent 2, so as to listen to the conversation therebetween. The voice platform acts to identify keywords in the conversation, and then sends a message including the keywords to the knowledge management system. The keywords received at the knowledge management system are displayed in the keyword display area 12 to the human agent, for selection by the agent as appropriate. It should be noted here that the keywords are sent to the KMS client application provided at the agent's computer 1 by the embodiments of the invention. The KMS client application is therefore not necessarily part of the KMS itself.

The operation of the first embodiment is formally illustrated in FIG. 5. Here, at step 7.1 the voice platform 42 acts to tap into the communications channel established between the human agent 2 and a caller. Next, at step 7.2 the voice platform (by virtue of the speech recognition application installed thereon) analyses the voice signals on the tapped channel which comprise the conversation between the human agent and the caller, so as to spot keywords in the conversation.

Having spotted the keywords, a message containing the keywords is then sent to the knowledge management system client application at the users computer 1, wherein the keywords identified are displayed to the human agent 2 in the keyword display portion 12. The human agent may then select any of the displayed keywords to be input to the knowledge management system's search engine, which is preferably a standard web style search engine.

At step 7.4, with the human agent 2 having selected one or more keywords as input to the knowledge management system search engine, the search engine performs the keyword searches as required and displays the search results to the agent in the information display portion 10 at step 7.5. In this way the search engine acts to relate the spotted keywords to items of information stored in the knowledge management system.

Thus, the first embodiment of the invention acts to allow predefined keywords which are known to produce relevant results from a knowledge management system when used as the input to keyword searches thereof to be automatically detected within a conversation between a call centre agent and a caller by the voice platform 42, and displayed to the call centre agent for selection. This improves call centre agent efficiency, as it means that the potentially relevant keywords are pushed to the agent for selection by the voice platform 42, such that the agent does not have to learn and recognise potentially relevant keywords themselves.

The operation of the voice platform 42 will now be discussed in further detail with reference to FIGS. 6 and 7.

FIG. 6 illustrates the dialogue flow of the speech recogniser application installed on the voice platform 42. The dialogue has no prompt playout, instead it simply loops round repeating the recognition until the caller clears down, or it is otherwise determined that there is no need to perform speech recognition. Keyword detection may be suspended at various points in the dialogue. For example, during the first phase of a call the dialogue usually involves the agent confirming the identity of the caller, and hence keyword detection during this phase will be a waste of recogniser resource. Moreover, once the agent has selected a keyword from the keyword window 12, the operation of the speech recognition application can be suspended since further keyword detection is unnecessary at this point.

Alternatively, in other embodiments the speech recognition application may be left running. In such a case then the same grammar may be re-used, or alternatively a different grammar may be applied reflecting that the agent has narrowed the topic of conversation and a more context specific keyword detection grammar can be applied. The structure of this different grammar may be identical to that of the initial grammar, the difference lying within the words or phrases which the later grammar is adapted to detect. A relevant grammar structure which may be used as the structure of the initial grammar or a later grammar if used is described later with respect to FIG. 7.

The operation of the speech recogniser application on the voice platform 42 is as follows. At step 5.1 the human call centre agent 2 answers an incoming call from a caller. The voice platform 42 taps into the communications channel between the agent and the caller, and at step 5.1 an evaluation is made as to whether the application should be in listening mode or not. If it is determined that listening mode is not required, for example because the call is in the caller identification phase as discussed above, then processing loops round such that this evaluation is made continuously until a positive result can be achieved. Once a positive result is achieved and the speech recogniser application is placed into listening mode, processing proceeds to step 5.3.

Here, at step 5.3 the speech recogniser application acts to recognise any keywords within the voice signals transmitted over the channel between the agent and the caller representative of the conversation there between. Keywords are detected using a keyword detection grammar, which is described later with respect to FIG. 7. At step 5.4 the recogniser acts to detect keywords, and information concerning detected keywords is transmitted to the knowledge management system client application at the agent's computer 1 for display in the keyword display portion 12. Finally, at step 5.5 a second evaluation is made to determine whether the call has finished, and if not then processing returns to step 5.2 wherein the listening evaluation is performed once again. The processing loops round in this way continuously until the call is finished, such that keywords may be continuously detected within the conversation between the human agent 2 and the caller. The operation of the speech recogniser application on the voice platform 42 finishes once the evaluation at step 5.5 returns positive i.e. once the call has finished.

Figure 7:
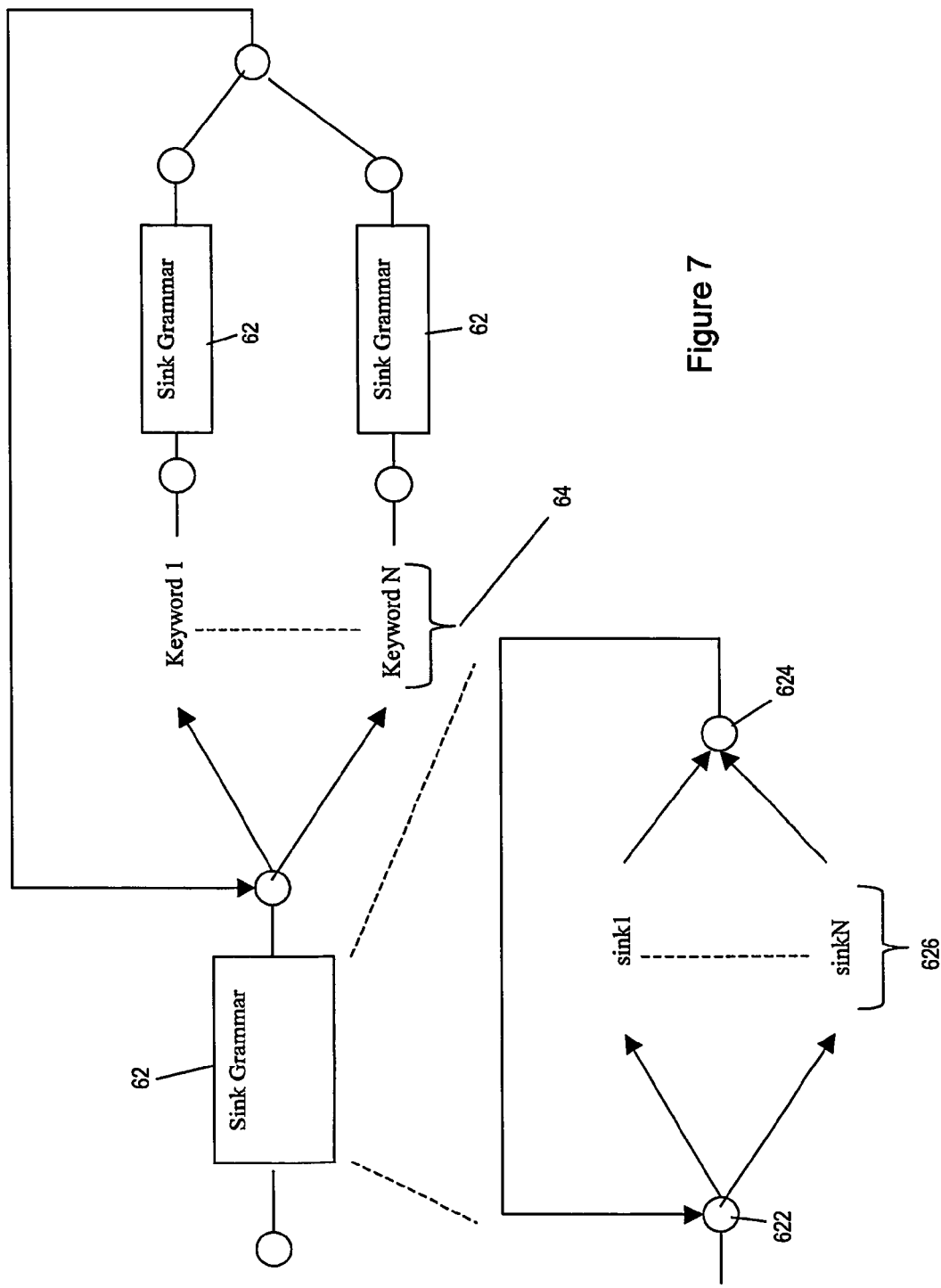
FIG. 7 is a diagram illustrating the grammar structure preferably used in the keyword recogniser of the embodiments of the present invention.

FIG. 7 illustrates the keyword recogniser grammar, which is a context free grammar where the keywords to be detected are embedded in optional sink words or phrases. It should be noted that this grammar is one of many types that could be used, and in alternative embodiments of the invention keyword detection may be performed using a statistical language model recogniser where the keywords or phrases are present (along with many other words) in the language model, and the output of the language model recogniser is filtered by a natural language understanding system to generate the list of detected keywords. Such technology is known in the art already, and is provided by many speech recognition vendors, including Nuance Communications, of 1005 Hamilton Court, Menlo Park, Calif. 94025, SpeechWorks International, Inc., of 695 Atlantic Avenue, Boston, Mass. 02111, and Philips Speech Processing, of 14140 Midway Road, Suite # 100, Dallas, Tex. 75244, USA.

Returning to the grammar of the first embodiment, however, the grammar comprises a plurality of sets of sink grammars 62, which themselves comprise a plurality of sink words or phrases 626. A set 64 of predefined keywords to be recognised is further provided embedded within the grammar. FIG. 7 illustrates how the set of keywords 64 are embedded within the grammar. A first sink grammar 62 is provided at the input to the grammar, the output of which may then flow through one of the set of keywords 64. A second sink grammar set 62 is then provided at the output of every keyword in the set 64 of keywords. The output of these second sets of sink grammars 62 then loops back round to the input to the set of keywords 64.

FIG. 7 also illustrates in detail the internal structure of one of the sink grammar sets 62, in that an input node 622 is provided to a sink grammar set 62, which allows the recognition process flow to lead into any one of a number of sink words in a sink word set 626. A second node 624 then collects the output from each word in the sink word set 626 and provides a feedback loop back to the input node 622 in the event of no recognition being performed. Thus, for any particular sink grammar 62, the grammar structure causes the recognition process to continuously loop until one of the sink words or phrases 626 has been recognised. Each path within the sink grammar may be a phoneme, word, or phrase depending on the functionality of the particular recogniser system used.

Where, as described earlier, it is possible for the operation of the speech recognition application to include a further, narrower, recognition grammar which is used once a first keyword has been selected by the agent, then that narrower grammar may have the same structure as described above, with the difference that different sink phrases and keywords will be used to reflect the narrower scope of the grammar.

Figure 1:
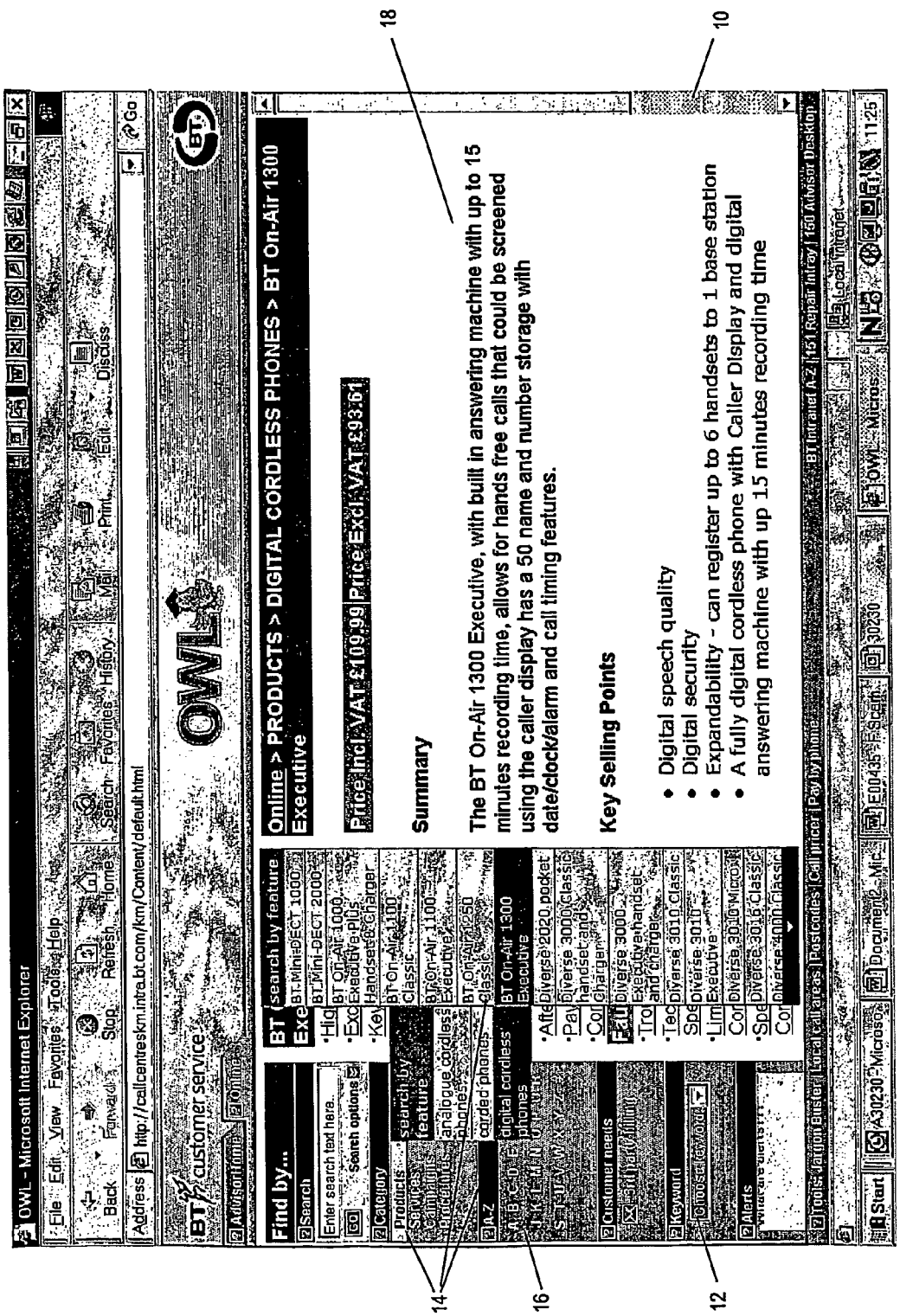
FIG. 1 is a screen-shot of a prior art knowledge management system, illustrating the user interfaces there into.
Figure 2:
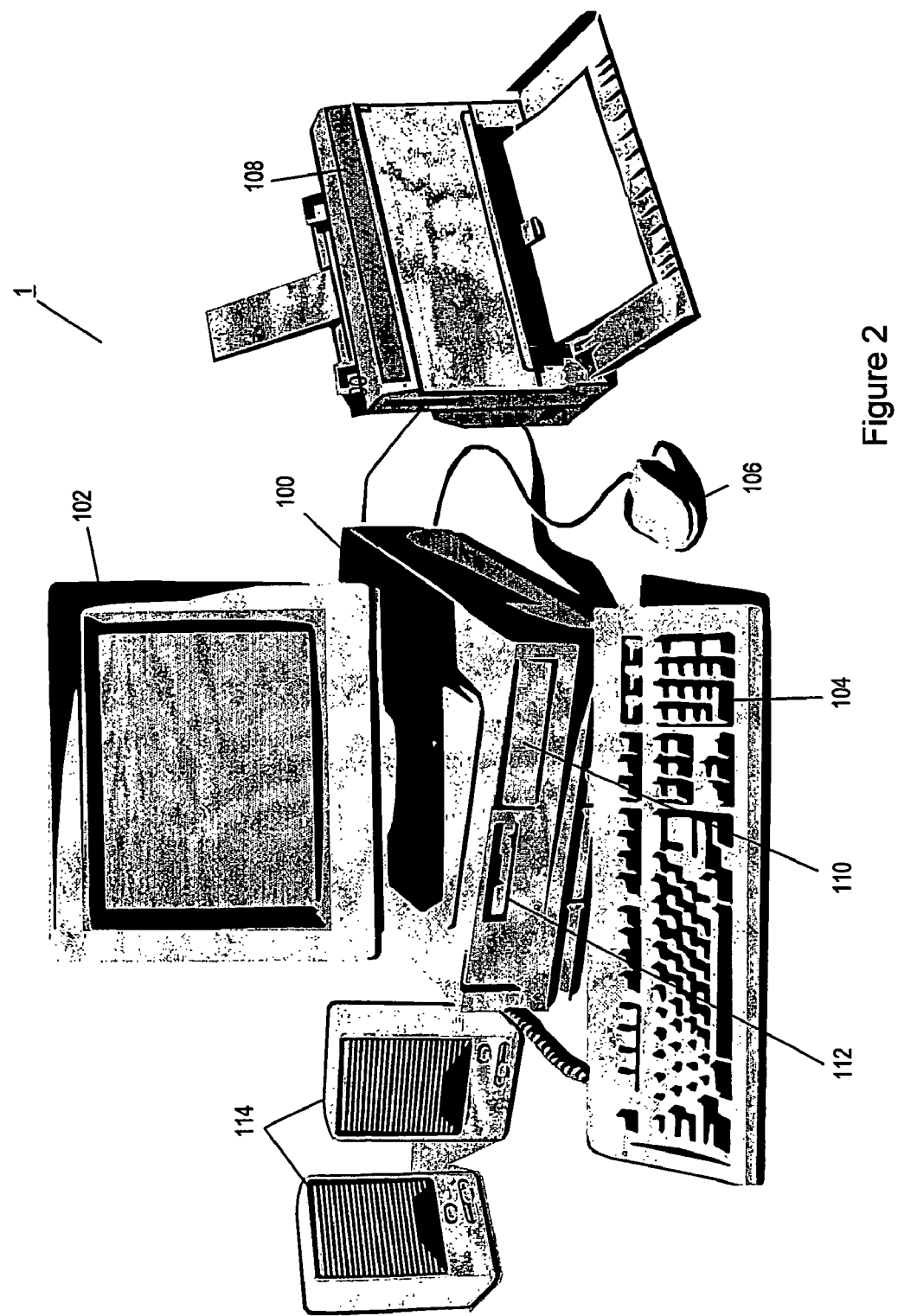
FIG. 2 is an illustration showing a general purpose computer which may form a basis of the embodiments of the present invention.

Within the first embodiment, the computers hosting the knowledge management system and voice platform are general purpose computers provided with controlling software program modules arranged to cause the computers to function as described above. FIG. 2 illustrates an example general purpose computer system which provides such an operating environment. Such program modules may include processes, programs, objects, components, data structures, data variables, or the like that perform tasks or implement particular abstract data types. Moreover, it should be understood by the intended reader that the invention may be embodied within other computer systems other than those shown in FIG. 2, and in particular hand held devices, notebook computers, main frame computers, mini computers, multi processor systems, distributed systems, etc. Within a distributed computing environment, multiple computer systems may be connected to a communications network and individual program modules of the invention may be distributed amongst the computer systems.

With specific reference to FIG. 2, a general purpose computer system 1 which may form the operating environment of the computers of the first embodiment of the invention, and which is generally known in the art comprises a desk-top chassis base unit 100 within which is contained the computer power unit, mother board, hard disk drive or drives, system memory, graphics and sound cards, as well as various input and output interfaces. Furthermore, the chassis also provides a housing for an optical disk drive 110 which is capable of reading from and/or writing to a removable optical disk such as a CD, CDR, CDRW, DVD, or the like. Furthermore, the chassis unit 100 also houses a magnetic floppy disk drive 112 capable of accepting and reading from and/or writing to magnetic floppy disks. The base chassis unit 100 also has provided on the back thereof numerous input and output ports for peripherals such as a monitor 102 used to provide a visual display to the user, a printer 108 which may be used to provide paper copies of computer output, and speakers 114 for producing an audio output. A user (in this case the call centre agent) may input data and commands to the computer system via a keyboard 104, or a pointing device such as the mouse 106.

It will be appreciated that FIG. 2 illustrates an exemplary embodiment only, and that other configurations of computer systems are possible which can be used with the present invention. In particular, the base chassis unit 100 may be in a tower configuration, or alternatively the computer system 1 may be portable in that it is embodied in a lap-top or notebook configuration.

Figure 3:
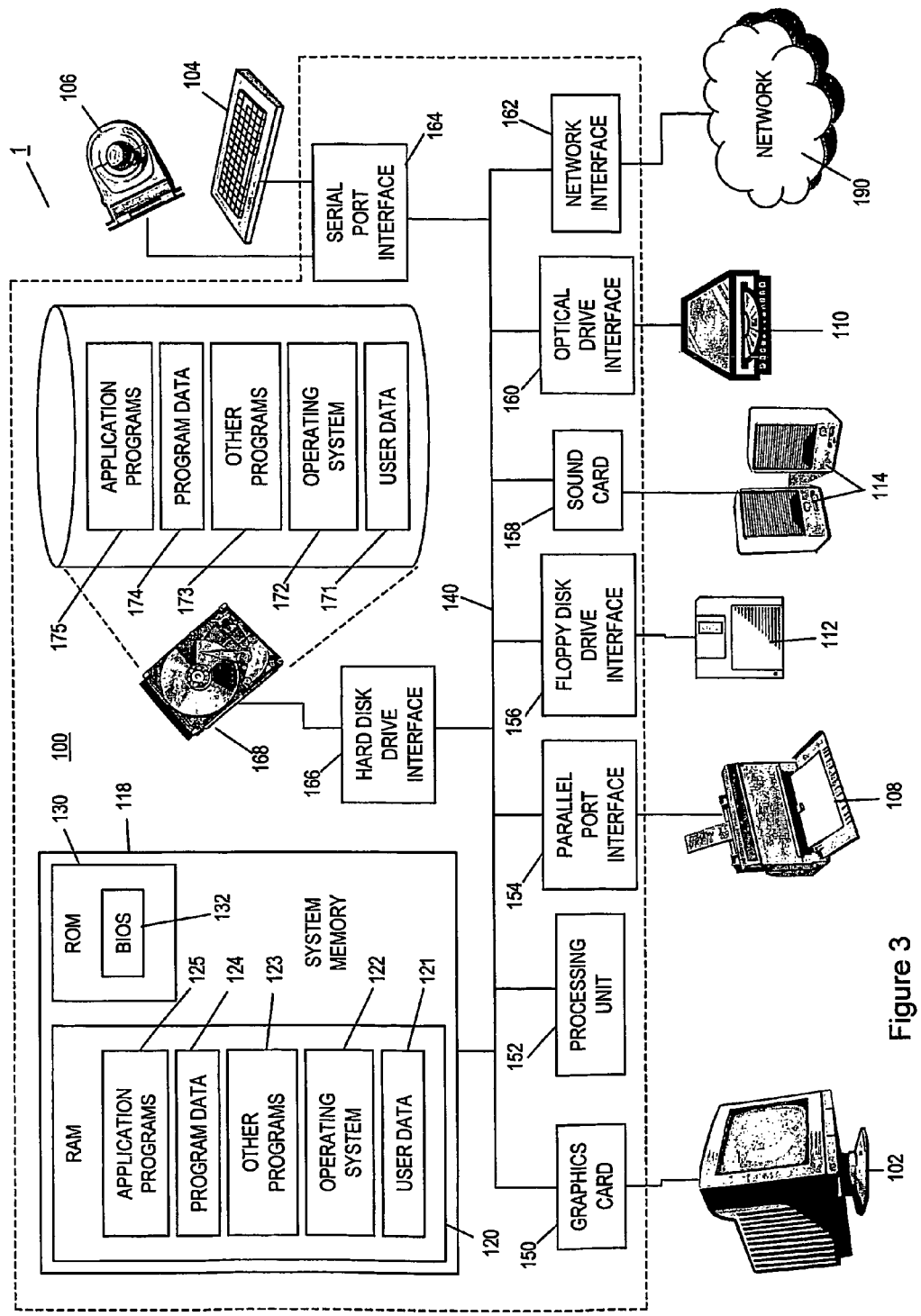
FIG. 3 is a schematic block diagram showing the various system elements of the general purpose computer of FIG. 2.

FIG. 3 illustrates a system block diagram of the system components of the computer system 1. Those system components located within the dotted lines are those which would normally be found within the chassis unit 100.

With reference to FIG. 3, the internal components of the computer system 1 include a mother board upon which is mounted system memory 118 which itself comprises random access memory 120, and read only memory 130. In addition, a system bus 140 is provided which couples various system components including the system memory 118 with a processing unit 152. Also coupled to the system bus 140 are a graphics card 150 for providing a video output to the monitor 102; a parallel port interface 154 which provides an input and output interface to the system and in this embodiment provides a control output to the printer 108; and a floppy disk drive interface 156 which controls the floppy disk drive 112 so as to read data from any floppy disk inserted therein, or to write data thereto. In addition, also coupled to the system bus 140 are a sound card 158 which provides an audio output signal to the speakers 114; an optical drive interface 160 which controls the optical disk drive 110 so as to read data from and write data to a removable optical disk inserted therein; and a serial port interface 164, which, similar to the parallel port interface 154, provides an input and output interface to and from the system. In this case, the serial port interface provides an input port for the keyboard 104, and the pointing device 106, which may be a track ball, mouse, or the like.

Additionally coupled to the system bus 140 is a network interface 162 in the form of a network card or the like arranged to allow the computer system 1 to communicate with other computer systems over a network 190. The network 190 may be a local area network, wide area network, local wireless network, or the like. The network interface 162 allows the computer system 1 to form logical connections over the network 190 with other computer systems such as servers, routers, or peer-level computers, for the exchange of programs or data. Within the embodiment, connections can be formed with the computer hosting the voice platform (if different to the human agent's computer) and the knowledge management system.

In addition, there is also provided a hard disk drive interface 166 which is coupled to the system bus 140, and which controls the reading from and writing to of data or programs from or to a hard disk drive 168. All of the hard disk drive 168, optical disks used with the optical drive 110, or floppy disks used with the floppy disk 112 provide non-volatile storage of computer readable instructions, data structures, program modules, and other data for the computer system 1. Although these three specific types of computer readable storage media have been described here, it will be understood by the intended reader that other types of computer readable media which can store data may be used, and in particular magnetic cassettes, flash memory cards, tape storage drives, digital versatile disks, or the like.

Each of the computer readable storage media such as the hard disk drive 168, or any floppy disks or optical disks, may store a variety of programs, program modules, or data. In particular, the hard disk drive 168 in the embodiment particularly stores a number of application programs 175, application program data 174, other programs required by the computer system 1 or the user 173, a computer system operating system 172 such as Microsoft® Windows®, Linux™, Unix™, or the like, as well as user data in the form of files, data structures, or other data 171. The hard disk drive 168 provides non volatile storage of the aforementioned programs and data such that the programs and data can be permanently stored without power.

In order for the computer system 1 to make use of the application programs or data stored on the hard disk drive 168, or other computer readable storage media, the system memory 118 provides the random access memory 120, which provides memory storage for the application programs, program data, other programs, operating systems, and user data, when required by the computer system 1. When these programs and data are loaded in the random access memory 120, a specific portion of the memory 125 will hold the application programs, another portion 124 may hold the program data, a third portion 123 the other programs, a fourth portion 122 the operating system, and a fifth portion 121 may hold the user data. It will be understood by the intended reader that the various programs and data may be moved in and out of the random access memory 120 by the computer system as required. More particularly, where a program or data is not being used by the computer system, then it is likely that it will not be stored in the random access memory 120, but instead will be returned to non-volatile storage on the hard disk 168.

The programs which may be stored in the first embodiment of the invention are the speech recognition application on the computer forming the voice platform 42, a knowledge management system client application on the agent's computer 1, and a knowledge management system server application on the computer hosting the knowledge database 44. It should be noted that the voice platform may be provided by the agent's computer i.e. the speech recognition application is installed directly on the agent's computer 1.

The system memory 118 also provides read only memory 130, which provides memory storage for the basic input and output system (BIOS) containing the basic information and commands to transfer information between the system elements within the computer system 1. The BIOS is essential at system start-up, in order to provide basic information as to how the various system elements communicate with each other and allow for the system to boot-up.

Whilst FIG. 3 illustrates one embodiment of the invention, it will be understood by the skilled man that other peripheral devices may be attached to the computer system, such as, for example, microphones, joysticks, game pads, scanners, or the like. In addition, with respect to the network interface 162, we have previously described how this is preferably a network card, although equally it should also be understood that the computer system 1 may be provided with a modem attached to either of the serial port interface 164 or the parallel port interface 154, and which is arranged to form logical connections from the computer system 1 to other computers via the public switched telephone network (PSTN). Both a modem and network card may be provided if required.

Where the computer system 1 is used in a network environment, it should further be understood that the application programs, other programs, and other data which may be stored locally in the computer system may also be stored, either alternatively or additionally, on remote computers, and accessed by the computer system 1 by logical connections formed over the network 190.

A second, preferred embodiment of the invention will now be described with reference to FIGS. 8 to 11. The second embodiment shares several common elements with the first embodiment as described above, which will become apparent from the following description.

The operating principle of the second embodiment of the invention is as follows. A conversation between a call centre human agent 2 and a caller is monitored by a voice platform so as to identify predetermined keywords within the conversation. The voice platform then sends the detected keywords to a keyword processing application running on a server, which acts to process the keywords to relate the detected keywords to one or more items of information which are contained within a pre-existing knowledge management system. The items of information are then ordered by relevance, and a message is sent to the human agent's computer wherein short cuts to the items of information are displayed in a short-cut display portion of the computer display. The human agent may then select the short-cuts, which results in the item of information being retrieved from the knowledge management system and displayed in the display portion of the human agent's computer. Thus, the second embodiment of the invention acts to push information from the knowledge management system to the human agent, but with the additional benefit that the items of information have been selected based on keywords spotted by a speech recogniser. In this way, only those items of information which are determined to be of real relevance to the subject of the conversation between the human agent and the caller are pushed to the human agent.

As mentioned previously, within the description of the second embodiment by use of the term "keyword" we implicitly mean both keyphrases as well as keywords.

Figure 8:
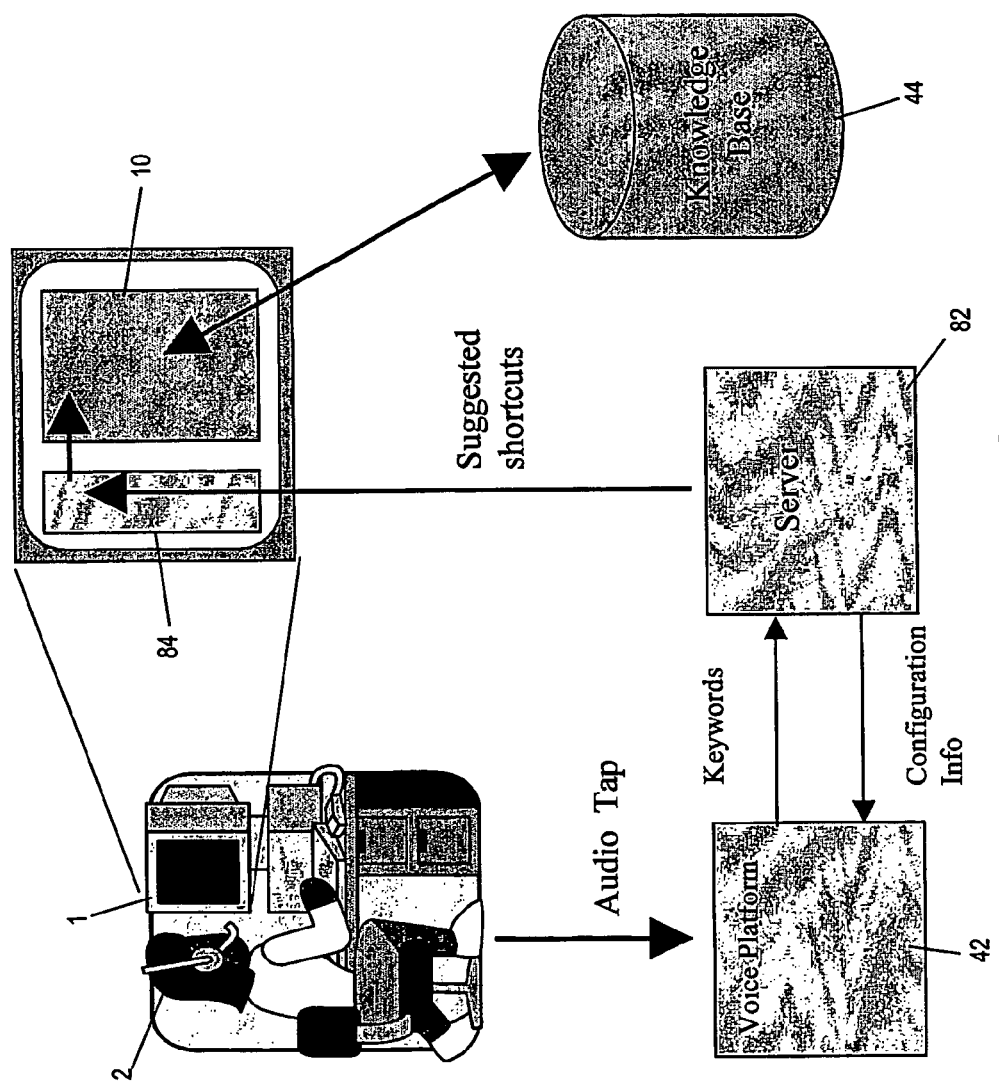
FIG. 8 is a system block diagram illustrating the system blocks of a second embodiment of the present invention.

FIG. 8 illustrates a block diagram of the preferred embodiment of the present invention. Here, a human agent 2 employed in a call centre is provided with a general purpose computer 1, which has logical connections into a knowledge management system comprising a knowledge database 44. A knowledge management system client application is stored on the agent computer 1, which provides a web style display, having an information display portion 10, and an information short-cut display portion 84. Further provided is a speech recogniser application which is installed on either the agent computer 1, or another computer, and which acts as a voice platform 42 for the speech recogniser application. The voice platform 42 is arranged to listen to a communications channel such as a telephone line which is established between the human agent 2 and a caller when a call is being received by the human agent. The speech recogniser application on the voice platform 42 is arranged to listen to the voice signals on the communications channel to determine the existence of one or more predefined keywords within the conversation represented by such voice signals.

Once the voice platform 42 has detected keywords in the conversation, information concerning the keywords is transmitted to a keyword processing application running on the server 82. The keyword processing application acts to process the keywords to relate the keywords to items of information held within the knowledge database 44 of the knowledge management system. The processing of the keywords to perform this function will be described later. The server 82 can control the voice platform 42 by sending configuration information to the voice platform, which, for example, controls when the voice platform should monitor any conversation being made by the call centre agent 2.

Having performed the relating step, and determined which items of information in the knowledge management system are perhaps relevant to the topic of the conversation between the human agent and the caller, a message indicating the identified items of information is passed to the knowledge management system client application running on the agent computer 1. This application then displays short-cuts to the identified information in a short-cut display portion 84 of the computer display, which shortcuts may then be selected by the human agent 2 by clicking thereon with a pointing device such as a mouse or the like. The short-cut to the item of information which is considered to be most relevant may be automatically highlighted, such that all the human agent may do is press a key on the keyboard to select that shortcut. Moreover, preferably the item of information which is deemed most relevant can be preloaded into the display portion 10 from the knowledge management system knowledge database 44, by the knowledge management system client application. When a user selects a short cut from the short cut display 84, the knowledge management system client application sends a message to the knowledge management server application which accesses the knowledge database 44, thus retrieving the required item of information, which is displayed on the display portion 10 of the display.

Figure 9:
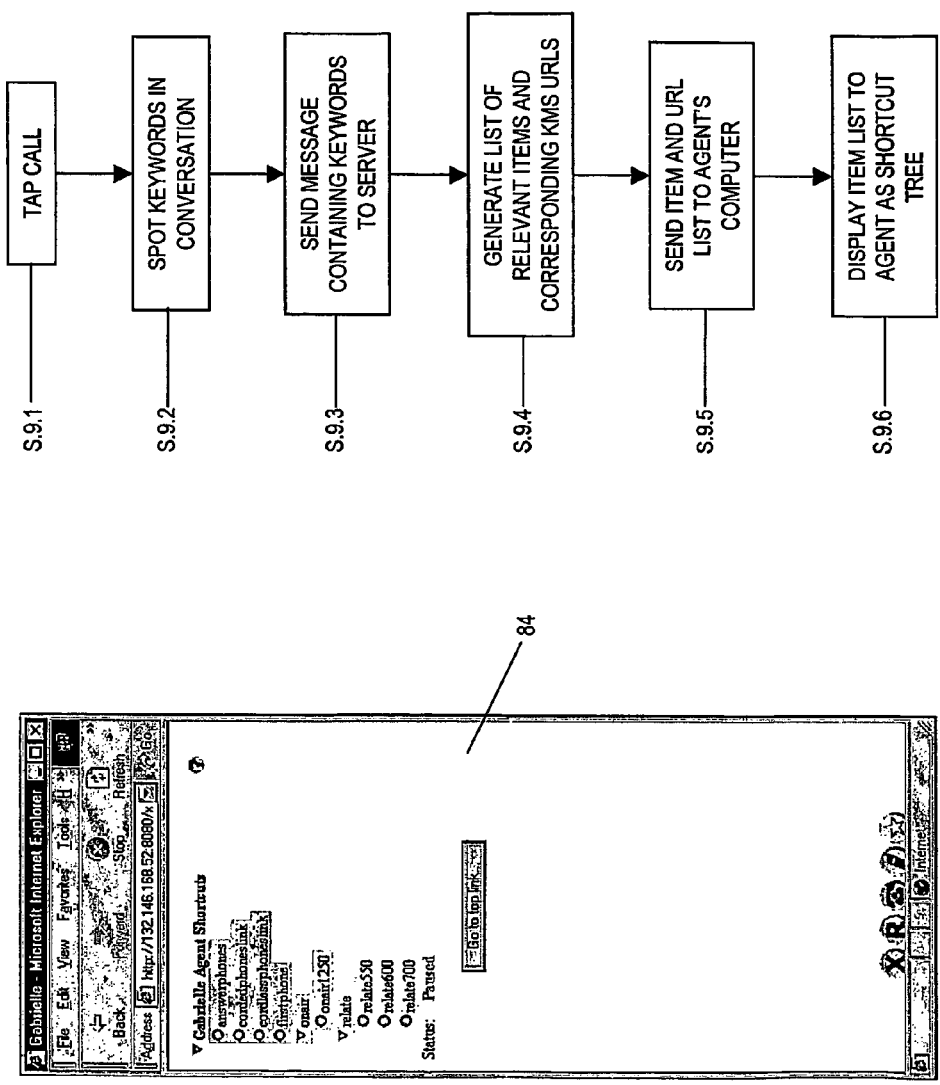
FIG. 9 is a system flow diagram illustrating the steps performed by the second embodiment of the present invention.

FIG. 9 formally illustrates the operation of the second embodiment in the form of a flow diagram. More particularly, at step 9.1 the voice platform 42 acts to tap into a call between the human call centre agent 2 and a caller. Next, at step 9.2 the speech recogniser application on the voice platform 42 spots keywords in the conversation. It should be noted here that the voice platform 42 and the operation of the speech recogniser application installed thereon is identical to that as previously described in the first embodiment, and hence no further discussion thereof will be undertaken here.

Having spotted keywords in the conversation, at step 9.3 the voice platform 42 sends a message containing the spotted keywords to the server 82.

At the server 82, the received keyword message is input to a keyword processing application which operates at step 9.4 to generate a list of relevant items of information which are contained within the knowledge database 44 of the existing knowledge management system. In addition, the server also looks up the corresponding universal resource locator (URL) of the item of information within the knowledge management system. In this case, as the knowledge management system is web based, each item of information will have a unique URL.

Next, at step 9.5 the server 82 sends a message containing the item and URL list to the knowledge management client application running on the agent's computer 1. The client application then parses the message and displays the item list to the agent as a short-cut tree at step 9.6, the display being made in the short-cut display portion 84 of the user computer display. The agent may then select a short-cut from the display using a pointing device such as a mouse or the like, at which point the knowledge management system client application on the user computer 1 transmits the selection to a knowledge management server application, which acts to access the information to which the short cut relates from the knowledge database 44. The retrieved information is then transmitted back to the knowledge management system client application at the agents computer 1, and is displayed in the information display portion 10 of the display thereof.

Figure 10:
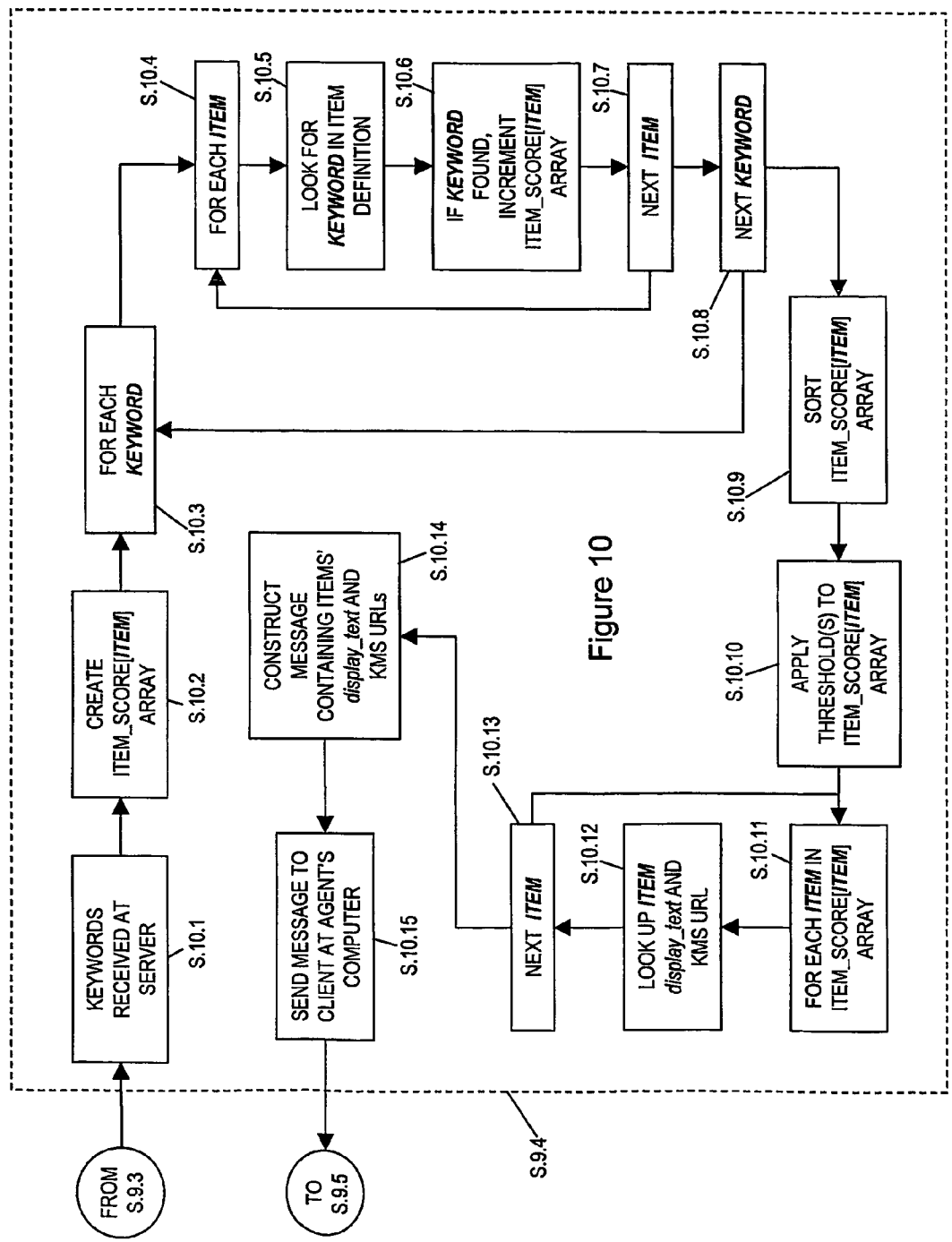
FIG. 10 is a flow diagram illustrating in further details the steps involved in the operation of step 9.4 of FIG. 9.

The operation of the server 82 in the step 9.4 will now be described in further detail with reference to FIG. 10.

Proceeding from step 9.3, at step 10.1 the server 82 receives keywords from the voice platform 42. Next, at step 10.2 the server creates an array data structure item_score [item]. The item_score[item] array contains a score value for each possible item of information which is known to be in the knowledge database 44. Upon the array creation at step 10.2, the item score for each item is initialised to zero.

The server 82 is provided with information on every item of information available within the knowledge database 44 of the knowledge management system in advance, and stores such information for later use by the keyword processing application. The item information is stored within the preferred embodiment as an XML source file, an extract from which is shown below:

```
<item>
    <url>objectID=8</url>
    <displaytext>Products/Analogue cordless phones/Quartet 1100 white</displaytext>
    <keyword>quartet</keyword>
    <keyword>analogue</keyword>
    <keyword>cordless</keyword>
    <keyword>eleven hundred</keyword>
</item>
    <item>
    <url>objectID=9</url>
<displaytext>Products/Analogue cordless phones/Quartet twin silver</displaytext>
    <keyword>quartet</keyword>
    <keyword>analogue</keyword>
    <keyword>cordless</keyword>
    <keyword>twin</keyword>
<keyword></keyword>
</item>
    <item>
    <url>objectID=10</url>
<displaytext>Products/Analogue cordless phones/Quartet twin white</displaytext>
    <keyword>quartet</keyword>
    <keyword>analogue</keyword>
    <keyword>cordless</keyword>
    <keyword>twin</keyword><keyword></keyword>
</item>
    <item>
    <url>objectID=11</url>
<displaytext>Products/Analogue cordless phones/Quartet 1500t</displaytext>
    <keyword>quartet</keyword>
    <keyword>analogue</keyword>
    <keyword>cordless</keyword>
    <keyword>1500</keyword><keyword></keyword>
</item>
<item>
    <url>objectID=12</url>
    <displaytext>Products/Analogue cordless phones/Quartet 1500 twin champagne</displaytext>
    <keyword>quartet</keyword>
    <keyword>analogue</keyword>
    <keyword>cordless</keyword>
    <keyword>1500</keyword><keyword></keyword>
</item>
<item>
    <url>objectID=13</url>
    <displaytext>Products/Analogue cordless phones/Quartet 1500 twin white</displaytext>
    <keyword>quartet</keyword>
    <keyword>analogue</keyword>
    <keyword>cordless</keyword>
    <keyword>1500</keyword>
</item>
<item>
    <url>objectID=14</url>
    <displaytext>Products/Analogue corded phones/Decor 110
    </displaytext>
    <keyword>decor</keyword>
    <keyword>analogue</keyword>
    <keyword>cordless</keyword>
    <keyword>110</keyword>
</item>
```

The source file contains an <item> entry for each item of information within the KMS. Each item entry has a corresponding unique URL reference to a page within the Knowledge management system relating to that item, as well as a <display_text> entry for each item. The display_text is that which will be displayed in the agent shortcut window if this URL is suggested. Each <item> entry also contains the set of keywords (or phrases) that are pre-determined as being relevant or indicative of the item, and which may trigger this item to be suggested to the agent. Each keyword for each item has a keyword-item-score associated therewith, which is the numerical score which is added to the item's score to which the keyword relates in the item_score[item] array should that keyword be detected by the voice platform. The display_text for each item preferably includes path type information (separated by a '/') which allows URL suggestions with common paths to be grouped in a shortcut tree, in the same way that filename paths allow files in directory trees to be grouped.

Returning to FIG. 10, having created the item_score[item] array, at step 10.3 the server 82 initiates a processing loop wherein for each keyword which has been received from the voice platform 42 the steps 10.4 to steps 10.7 are performed as described next. Step 10.8 represents the end of the processing loop started at step 10.3, and is an evaluation to determine whether every keyword received by the server from the voice platform has been processed by the loop.

The processing loop defined by the steps 10.3 to steps 10.8 operates as follows.

At step 10.4, a second, nested, processing loop is initiated comprising steps 10.5 and steps 10.6, which are performed for each item for which there is an item entry in the XML source file stored at the server. This loop is terminated by an evaluation at step 10.7 which determines whether all the items have been processed for a particular keyword. Thus, the steps 10.3 to 10.8 represent 2 nested processing loops which act to perform the steps of step 10.5 and step 10.6 for each item in the XML source file, for each keyword. In particular, at step 10.5 for the particular item being processed by the inner loop, the present keyword is searched for within the item definition of the XML source file. Next, at step 10.6, if the keyword searched for at step 10.5 in the item definition is found therein, the item score for the item for which the item definition relates is incremented, in the item_score[item] array.

Through such a nested loop structure, every keyword which is received from the voice platform is searched for in every item definition in the XML source file, and an item score corresponding to the number of keywords detected for each item is maintained in the item_score[item] array.

It should be noted that a number of scoring systems are possible for calculating the scores maintained within the item_score[item] array. More particularly, a first method is simply to count the number of relevant keywords which are detected for each item. Here, every keyword-item-score (being the score attributable to a particular keyword for a particular item) is set to 1.0, and the item cumulative score is then the sum of keyword-item-scores.

Alternatively, in an alternative method, every keyword-item-score is set to (count of occurrences of keyword with item)/(count of occurrences of keyword across all items), which is calculated from the input configuration file to the system which defines the set of keywords to detect for each item. In such a case the item score is then the sum of these weighted-keyword-item-scores.

In a third method, the keyword-item-score is the probability of the item generating this keyword, and the cumulative score for $item_q$ is then $$P(S_u | item_q) \cong \prod^{\forall k \in S_u} P(k | item_q) \prod^{\forall k \notin S_u} (1 - P(k | item_q))$$

where $S_u$ is the set of observed keywords in an spoken utterance U and where $K_q$ is the set of keywords initially defined for item q assumes independence of k given an item and where initially $P(k|item_q)=0.7 \; \forall k \in K_q$ $P(k|item_q)=0.1 \; \forall k \notin K_q$ and where k∈K, the set of all keywords.

0.1 and 0.7 are arbitrary initial values. The values are subsequently re-estimated on the basis of the items selected by the agent and the original keywords that resulted in the item being suggested to the agent.

In all the above three schemes the item cumulative score may also include the keyword confidence returned by the voice processing platform. Preferably the keyword confidence is weighted by the number of phonemes within the keyword pronunciation such that detection of the keyword "broadband" is given more significance than detection of the keyword "line". Additionally the scoring system may accumulate item scores across multiple recognitions within a single telephone call, thereby the items stabilise on the best set for a particular call.

In a modification to the above described arrangements, in other embodiments before looking up the keywords (i.e. performing the steps 10.3 to 10.8), a confidence test is applied to the keywords received from the voice processing platform. The keyword sequence may contain standalone keywords e.g. "internet" or keywords that form part of a key phrase, e.g. "answering machine". A number of confidence measures are applied to filter out poor performing keywords and key phrases.

1) First Standalone Keywords Recognition Confidence is Tested to See if it is Above a Threshold KeyConf1

For keywords within a key phrase then the if the number of keywords with confidence> Threshold1 (e.g. 55) exceeds the number of keywords with confidence below the Threshold1 then the entire phrase is accepted. If the number of keywords with confidence <Threshold1 exceeds the number of keywords with confidence> Threshold1 then the entire phrase is rejected. In the special case where there is an equal number above and below the threshold then the keywords confidences are compared to a second lower threshold Threshold2 (e.g. 40), if the number of keywords exceeds Keyconf2 then the entire phrase is accepted otherwise the phrase is rejected.

Returning to FIG. 10, having determined the item scores for each item, at step 10.9 the item_score[item] array is sorted into order, such that the item with the highest item score is located at the top (or alternatively at the bottom depending on the order of the sort) of the array, followed by the next most relevant item, and so on down the array to the least most relevant item according to the item score.

The sorted array is then truncated by either of the following methods
a) the array length is limited to a maximum size e.g. 5
b) the array length is limited by comparing each item score to the best item score only items whose score is greater than proportion e.g. 50% of the best item score are retained.

Next, at step 10.10 numerical thresholds may be applied to the item scores in the truncated array, in order to further reduce the number of items in the array. That is, a threshold may be applied which acts to remove from the array those items for which the corresponding respective item scores thereto do not meet a predetermined threshold. Preferably, the threshold can be set by the human agent 2, to allow the sensitivity of the system to be adjusted. Where a low threshold is set then more results will be returned, whereas if a high threshold is selected then only short-cuts relating to the most relevant items of information will be pushed to the human agent.

Having sorted the array and applied any relevant thresholds, at step 10.11 a new processing loop is commenced, wherein for each item in the item_score[item] array the item display text and corresponding KMS URL is looked up within the XML source file. This look-up operation is performed for each iteration of the loop at step 10.12. At step 10.13 an evaluation is made to determine whether all the items in the item score array have been processed by step 10.12, and if so processing proceeds to step 10.14.

At step 10.14, a message is constructed containing the respective items' display_texts and knowledge management system URLs, as looked up at step 10.12. The message structure is preferably such that the ordering of the array achieved by the sort at step 10.9 is communicated within the message. For example, the message structure may be such that the most relevant item's display_text and URL are placed at the start of the message, and the least relevant item's display_text and URL are placed at the end, with the remaining items' display_texts and URLs in respective order therebetween.

Having constructed the message, at step 10.15 the server 82 sends the message to the knowledge management system client at the agents computer 1. Processing then proceeds as already described with respect to FIG. 9.

At the KMS client application on the agent's computer, the received display_texts and URLs are displayed in the shortcut display area 84 as web-style shortcuts. The shortcuts are displayed as a collapsible directory tree which mirrors the menu hierarchy of the HTML KMS site. Each level of the tree is an active shortcut link in itself so that the agent may utilise the shortcut to bypass some or all of the intermediate HTML pages stored in the knowledge database 44 of the KMS.

The tree itself is dynamic and ordered. Shortcut suggestions are continually received from the server and added into the tree. The tree is reordered so that the newest shortcuts are positioned at the top of the display. If the size of the tree exceeds the available window size then the oldest shortcuts are removed. Fonts and background colours are utilised to indicate ageing of shortcuts such that the agent may quickly identify the new suggestions. A screen-shot of an example shortcut tree as would be displayed in the shortcut display portion 82 is shown in FIG. 11.

The agent can select a shortcut by clicking on the appropriate point in the tree, alternatively a keyboard shortcut and/or special button is provided which allows the agent to select the newest link without the need to move the mouse. The system can also be configured to enable auto loading of a page from the Knowledge Management system into the content window in the situation where there is a single high confidence shortcut identified.

Since HTTP requests into content management systems can take time, the KMS client has the option to request any identified shortcuts regardless of whether the agent has selected the link. This means that documents are loaded into the local browser cache at the earliest opportunity thereby ensuring that response is immediate when the agent selects the link. Usually the item of information whose shortcut is disposed at the top of the shortcut tree will be that which is pre-fetched, as this will have been determined as the most relevant on the basis of its item score.

Within the second embodiment various general purpose computers are provided to host the various applications. In particular the human agent is provided with the computer 1, which hosts the KMS client application, and may also host the speech recogniser application. Alternatively, another computer may host the speech recogniser application, and thus act as the voice platform 42. Another computer is provided to host the KMS server application and knowledge database 44. Each of the computers are rendered in communication with each other via a network and suitable network interfaces. Moreover, each of the computers has the same general architecture as previously described in the first embodiment, with respect to FIGS. 2 and 3.

The second embodiment thus allows for the pushing of information from an existing KMS to a call centre agent by the display of shortcuts thereto, the shortcuts having been determined by the monitoring and scoring of predetermined keywords which have been determined in advance as being of relevance to particular items of information in the KMS.

As mentioned previously, both the first and the second embodiments are previously described further include elements allowing for the selective activation of the speech recogniser in order to address the problem of attempting to minimise the cost of the speech recogniser resource by intelligently switching the recogniser on or off at appropriate times within the call. More particularly, if the speech recogniser is listening 100% of the time, then the recogniser is active for the entire duration of the call such that costs of the speech recogniser component may make a solution uneconomic. In particular speech recognition systems are often very expensive resources to use in any application. They are expensive both in software license costs (typically up to £2000 per concurrent recogniser), and they are also expensive in their use of processing hardware which can easily be another £1000 per concurrent recogniser.

However, we have observed that in calls to BT's call centres the typical call duration is 5 minutes. These calls typically have a structure that follows the following sequence

| Phase | Average duration |
|---|---|
| Greeting | (10 seconds) |
| Customer indentification | (60 seconds) |
| Problem identification | (60 seconds) |
| Advisor determination of solution | (60 seconds |
| Communication of solution to customer | (60 seconds) |
| Call wrap and goodbye | (50 seconds) |

From observing the calls we have determined that the "problem identification" phase of the call is the period in which the majority of keywords are usually spoken and so is the phase in which the speech recogniser must be active. The other phases contain few if any keywords and so it is undesirable to have the speech recogniser active at these points. The problem to be solved by the third embodiment of the invention is therefore of how to identify when the "problem identification" phase begins and ends since the duration of each phase varies significantly according to the nature of the caller and call, thus ensuring most cost effective use of expensive speech recognition resources.

Preferably, any mechanism that switches the recogniser on/off for the problem identification phase must require little or no manual intervention by the advisor since this will add to their cognitive load when dealing with the caller and invariably they will forget to switch the system on or off.

The invention according to the embodiments therefore describes a number of mechanisms for switching on and off keyword spotting such that the keyword spotter is active during the problem identification phase of the call only. Such measures thereby maximise the cost effective use of expensive software and hardware resources. Various techniques for detecting when to switch the recogniser on or switch the recogniser off are therefore described next.

With respect to switch on mechanisms, the embodiments provide numerous mechanisms, any one or more of which may be incorporated within embodiments of the invention.

Firstly, the recogniser may be triggered by the provision of a manual push to talk button on the adviser's computer screen 102. Here the advisor pushes the on screen button at the end of the customer identification phase, which triggers the speech recogniser to commence recognition.

A problem with the above mechanism is that advisors often forget to push the button to trigger the recogniser. Therefore to overcome this a second mechanism may be provided in the form of an automatic timer which is also used to turn the recogniser on automatically after a fixed time, e.g. 60 secs if the manual trigger is not used. This automatic timer assumes that the greeting phase and caller identification phase have a low variance around the mean time, which is usually not the case and so the automatic timer is better than the manual push to talk but still less than ideal.

In order therefore to provide an ideal solution a third mechanism may be provided, which makes use of window data entry tracking techniques. The ideal point at which to turn the recogniser on is when the caller identification phase has completed. In BT's call centres, and in many other call centres, the advisor completes an on-screen form 102 during the caller identification phase of a call with information collected during this phase. Completion of the form results in the window being closed, which generates an operating system event. This event is trapped by a voice platform 42 or server 82 shortcut application resident on the agent's desktop computer 1 and a message is sent to the voice platform 42 to indicate that the caller identification phase has completed and the recogniser is then switched on. Preferably the shortcut application is a Microsoft® Windows® application wrapped around Internet Explorers® 5. This is needed in order for the voice application and/or the server 82 to be able to detect the operating system messaging events which are associated with the Caller validation window closure.

As an alternative to detecting the operating system event corresponding to the caller validation window closure, a computer-telephony integration (CTI) event may be attached to the call to indicate the change in data relating to the call. Here the voice application utilises CTI events currently to note when a call is received by an agent turret, and hence the data change event may also be detected by the CTI client and used to switch the recogniser on at the appropriate time.

Therefore, using any one or more of the above mechanisms the voice application 42 can be controlled to switch the recogniser on at the appropriate time such that the recogniser operates during the problem identification phase of the call.

With respect to recogniser switch off mechanisms, the following may be provided.

Firstly, a button may be provided in the shortcut application resident on the agents desktop to allow the agent to manually switch the recogniser off. That is, once the agent determines that the recogniser is no longer needed then the recogniser pushes the button to stop the recogniser operation.

Secondly, an automatic timer may be provided which turns off the recogniser after a predetermined time. This timeout runs from when the recogniser is turned on. This timeout assumes that the duration of the problem specification phase has a low variance around the mean, which is not the case in many calls.

As a third solution the recogniser may be switched off in response to a CTI event. More particularly in some calls the advisor will hand the call off to a third party or will conference in a third party, and hence clearly at this point the problem has been identified and a solution determined i.e. to call a specific third party. There is therefore no point in continuing to spot keywords in what for instance might be audio containing a ring tone or an advisor to advisor conversation.

This transfer to a third party results in additional CTI events that may be detected by voice platform or by the server, and based on the type of CTI event detected the speech recogniser is switched off.

A fourth switch off mechanism is to switch off the recogniser when triggered by the recognition of a non-speech acoustics. In this case the recogniser itself can be arranged to recognise non-speech acoustics such as ring tones, dial tones, and the like, and to de-activate itself if such non-speech acoustics are detected. Alternatively, another application may perform the non-speech acoustics detection, and act to turn off the recogniser. Non-speech acoustics may be detected by a voice activity detector or the like as are well known in the art.

Finally, a fifth switch-off mechanism may be triggered by the selection of a URL by the agent, from those displayed to the user during the operation of the system (as shown in FIG. 11). In this case the assumption is made that if a suggestion is displayed to the advisor and then that suggestion is selected by the advisor then it is reasonable to assume that the suggestion is relevant to the call and that therefore the problem in respect of which the call was made has been identified and the solution is contained within the suggested URL. Thus in view of such a situation it is reasonable to switch off the keyword recogniser since there is no further point in listening. Thus, once the user has selected one of the URLs for viewing the recogniser is then further switched off.

It will be appreciated that any one or more of either the switch on or switch off mechanisms may be incorporated into either of the first or second embodiments as previously described to provide the embodiments of the invention. By doing so then the advantage of efficient use of recogniser resources is obtained.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

What is claimed is:

1. An information interface system, comprising:
a speech recognizer arranged to listen to telephone voice signals carried on a telephone communications channel between a user and another person, and to recognize at least one or more predefined keywords or phrases contained within the voice signals;
a keyword processor arranged to relate recognized keywords or phrases to items of information stored in an information database to identify relevant items of information thereto;
information display means arranged to display items of information and/or links thereto identified by the keyword processing means to the user; and
speech recognition control means arranged to automatically activate the speech recognizer in response to an operating system event automatically generated when a caller identification phase is completed.

2. A system according to claim 1, wherein the keyword processing means further comprises:

storage means for storing item definition data defining the items of information in the information database;

item matching means for matching recognized keywords or phrases to the item definition data; and item scoring means for keeping an item score for each item of information in dependence upon the number of keywords or phrases matched to each item.

3. A system according to claim 2, wherein the keyword processing means further comprises:

item sorting means arranged to sort the items of information in dependence on the respective item scores.

4. A system according to claim 2, wherein the keyword processing means further comprises:

item score thresholding means arranged to apply at least one threshold to the item scores, wherein those items whose item scores do not meet the threshold are not made available to the user.

5. A system according to claim 2, wherein the operating system event corresponds to a completion of an on-screen form.

6. A system according to claim 1, wherein:

the information display means is arranged to display the items of information and/or links thereto as a hierarchical structure, which matches the hierarchy of the information database.

7. A system according to claim 1, wherein:

the speech recognition means, the keyword processing means and the information display means are substantially continuously or periodically operable so as to continually or periodically update the items of information and/or links thereto displayed to the user.

8. A system according to claim 1, wherein:

the predetermined criteria are selected such that the speech recognition means is deactivated on that portion or portions of the voice signals which are not expected to contain keywords or phrases.

9. A method of interfacing information to a user, said method comprising:

listening to telephone voice signals carried on a telephone communications channel between the user and another person automatically recognizing, in response to an operating system event automatically generated when a caller identification phase is completed, at least one or more predefined keywords or phrases contained within the voice signals;

relating any recognized keywords or phrases to items of information stored in an information database so as to identify relevant items of information thereto; and displaying any item of information and/or links thereto so identified to the user.

10. A method according to claim 9, wherein the relating step further comprises:

storing item definition data defining the items of information in the information database;

matching recognized keywords or phrases to the item definition data; and keeping an item score for each item of information in dependence upon the number of keywords or phrases matched to each item.

11. A method according to claim 10, wherein the relating step further comprises:

sorting the items of information in dependence on the respective item scores.

12. A method according to claim 9, wherein the relating step further comprises:

applying at least one threshold to the item scores, wherein those items whose item scores do not meet the threshold are not made available to the user.

13. A method according to claim 9, wherein:

the displaying step is arranged to display the items of information and/or links thereto as a hierarchical structure, which matches the hierarchy of the information database.

14. A method according to claim 9, wherein the steps recited therein are substantially continuously or periodically repeated so as to continually or periodically update the items of information and/or links thereto displayed to the user.

15. A method according to claim 9, wherein:

the operating system event is selected such that the recognizing step is not performed on that portion or portions of the voice signals which are not expected to contain keywords or phrases.

16. A method according to claim 9, wherein the operating system event corresponds to a completion of an on-screen form.

17. An information interface system comprising:

a speech recognizer arranged to listen to telephone voice signals carried on a telephone communications channel between a user and another person, and to recognize at least one or more predefined keywords or phrases contained within the voice signals;

a keyword processor arranged to relate recognized keywords or phrases to items of information stored in an information database to identify relevant items of information thereto;

information display means arranged to display items of information and/or links thereto identified by the keyword processing means to the user; and an automatic timer arranged to automatically activate the speech recognizer after a predetermined time has expired since the start of the voice signals.

18. A method of interfacing information to a user, said method comprising:

listening to telephone voice signals carried on a telephone communications channel between the user and other person;

automatically recognizing, in response to the expiry of a predetermined time set by an automatic timer, at least one or more predefined keywords or phrases contained within the voice signals;

relating any recognized keywords or phrases to items of information thereto; and displaying any item of information and/or links thereto so identified to the user.

* * * * *